United States Patent
Dassa et al.

(10) Patent No.: US 8,756,224 B2
(45) Date of Patent: Jun. 17, 2014

(54) METHODS, SYSTEMS, AND MEDIA FOR CONTENT RANKING USING REAL-TIME DATA

(75) Inventors: Guy Dassa, New Rochelle, NY (US); Joseph P. Doran, Darien, CT (US)

(73) Assignee: Rallyverse, Inc., New York, NY (US)

( * ) Notice: Subject to any disclaimer, the term of this patent is extended or adjusted under 35 U.S.C. 154(b) by 0 days.

(21) Appl. No.: 13/162,527

(22) Filed: Jun. 16, 2011

(65) Prior Publication Data

US 2011/0314007 A1  Dec. 22, 2011

Related U.S. Application Data

(60) Provisional application No. 61/355,360, filed on Jun. 16, 2010.

(51) Int. Cl.
G06F 17/30 (2006.01)
(52) U.S. Cl.
CPC .............................. *G06F 17/30017* (2013.01)
USPC .......................................................... 707/723
(58) Field of Classification Search
USPC .......... 707/706, 711, 723, 748, 749, 752, 753
See application file for complete search history.

(56) References Cited

U.S. PATENT DOCUMENTS

| | | | |
|---|---|---|---|
| 7,660,815 B1 * | 2/2010 | Scofield et al. | 707/999.102 |
| 7,725,453 B1 * | 5/2010 | Chen et al. | 707/711 |
| 2009/0164450 A1 * | 6/2009 | Martinez et al. | 707/5 |

OTHER PUBLICATIONS

Y Zhang et al., Weighting Links Using Lexical and Positional Analysis in Web Ranking, Jul. 20-22, 2008, IEEE, 9-16.*

* cited by examiner

*Primary Examiner* — Jean B Fleurantin
(74) *Attorney, Agent, or Firm* — Byrne Poh LLP

(57) ABSTRACT

Methods, systems, and media for content ranking using real-time data are provided. In accordance with some embodiments of the present invention, a method, implemented on a processor, for ranking content is provided. The method can include, among other things: receiving real-time information from a plurality of sources; supplementing the received real-time information with historical information and user influence information; analyzing the supplemented real-time information from the plurality of sources to determine real-time trend information; receiving a plurality of content snippets from a content provider; detecting similarities between each of the plurality of content snippets and the determined real-time trend information; ranking the plurality of content snippets based on the detected similarities; and displaying the ranked plurality of content snippets.

19 Claims, 13 Drawing Sheets

Feed results for http://feeds1.nytimes.com/nyt/rss/Sports on 3/26/2010 4:20 PM

| Pos | Title | Description | Original Position | Score | Matching Trends |
|---|---|---|---|---|---|
| 1 | U.S. Makes Final Cuts for World Cup Roster | Forwards Edson Buddle and Herculez Gomez were among 23 players named to the United States' final roster for the World Cup, while striker Brian Ching was left off. | 3 | 0.54 | attempt cap oil gusher sand cement televised fill void |
| 2 | Suns' Dragic an Able Substitute for Nash | The Suns may have an heir apparent to Steve Nash in the 24-year-old Slovenian Goran Dragic. | 45 | 0.23 | dragic, nash |
| 3 | Suns 115, Lakers 106: Suns Beat Lakers and Tie Series | Phoenix made 11 3-pointers and controlled the inside to win Game 4 of the Western Conference finals. | 7 | 0.15 | lakers |
| 4 | On Football: Jets Owner Instrumental in Luring Super Bowl | The N.F.L. gave the 2014 game to the New Meadowlands, which will host the first cold-weather Super Bowl. | 6 | 0.14 | super bowl york jersey |
| 5 | Leading Off: The Cold Weather Super Bowl Prompts Complaints | Weather dominated talk about the New York/New Jersey Super Bowl in 2014. | 29 | 0.14 | super bowl york jersey |
| 6 | In Tennis, Fashion Police Look the Other Way | Controversial fashion choices have been a part of tennis practically since the game was invented. | 1 | 0.00 | |
| 7 | In the Arena: Roland Garros Deals With Growing Pains | Moving the French Open tennis tournament is being considered because the tournament has outgrown the current area where it's staged. | 2 | 0.00 | |
| 8 | Hoffman Works to Regain Closer's Role With Brewers | The Brewers say Trevor Hoffman, owner of 596 major league saves, needs another solid outing in middle relief to get his job back as the team's closer. | 4 | 0.00 | |
| 9 | Cycling Doping Investigations May Broaden to Include Other Charges | Authorities are seeking to determine whether Lance Armstrong and others conspired to defraud their sponsors by doping to improve their performances and garner more money and prizes. | 5 | 0.00 | |
| 10 | Sosa Won't Be Pursued on Perjury Charges | The Congressional committee that Sammy Sosa testified before in March 2005 decided not to ask the Department of Justice to investigate him on perjury charges. | 8 | 0.00 | |
| 11 | With Shaky Serve, Venus Williams Wins Second-Round Match | After a rocky start, Venus Williams stole a number of breaks and settled in for a 6-2, 6-4 victory over Arantxa Parra Santonja. | 9 | 0.00 | |

FIG. 6

Create and preview your Tout widget.

Configure a widget powered by the Tout Engine for your website or network below. Just fill in the fields below, click "Build Widget" and preview the result one the right. Happy with the results? Grab the Code and put it on your website. If not, edit the fields and preview again. You can keep at it until you are completely satisfied.

Name    widget1    ✓ Ok    ← 1010

Title    NY Real Estate Feed    ✓ Ok    ← 1020

RSS URL(s) - Please seperate the feeds using semi colons(;) or hit enter(limit of 5)
```
http://www.nytimes.com/services/xml/rss/nyt/reales
tate.xml
http://ny.curbed.com/atom.xml
```
← 1030

Width    280

Height    500

Title/Footer Background    FFFFFF

Title/Footer Font Color    000000

Main Background    FFFFFF

Main Font Color    000000

Font Size    Medium ▼

Max. Results    10

☑ Show Images
☑ Highlight Hot Items
☑ Show Feed Source
☑ Show Timestamp

1050 → [ Create widget & Get Code ]    [ Cancel ]

Preview This Widget    ← 1040

FIG. 10

METHODS, SYSTEMS, AND MEDIA FOR CONTENT RANKING USING REAL-TIME DATA

CROSS-REFERENCE TO RELATED APPLICATIONS

This application claims the benefit of U.S. Provisional Patent Application No. 61/355,360, filed Jun. 16, 2010, which is hereby incorporated by reference herein in its entirety.

FIELD OF THE INVENTION

The invention relates to ranking content using real-time data. More particularly, methods, systems, and media for ranking content based on real-time data, which can include real-time online trend data, influence data, and/or user interest and behavior data, are provided.

BACKGROUND

Digital publishers and advertisers working through their content management systems are constantly searching for approaches to place the right content in front of the right user at the right time in order to increase traffic to their websites.

Current approaches for presenting such content include using human editors that manually label and sort their content before it is published online. Once the content order is decided, it no longer changes on a user and/or time basis. Nowadays, content management systems are offering simple heuristic systems for ranking content which are based upon views or clicks (popular stories) or based upon views per time period (trending stories). However, these approaches only promote what users have already found to be relevant (for example, relevant to what is being talked about or related to a user's interests) or what the human editors have biased to succeed on the page. It should also be noted that there is a self-fulfilling false positive that minimizes the effective user engagement on the website.

To further complicate this, the social media ecosystem is exploding with users, usage, and innovation creating a real-time distributed media environment. Sharing of different types of content is happening across the web and other digital environments through, for example, social media networks (e.g., Facebook), Twitter, social content sharing services (e.g., Digg), e-mail, instant messaging, short message service (SMS) messaging, and various web services (e.g., ShareThis, AddThis, and bit.ly), among others.

With the advent of social media, consumer behavior has changed such that conversations and sharing of brands, content, and/or services is happening across the real-time web and not only at the destination site or through search engine results (e.g., using Google). As a result, publishers and advertisers are searching for approaches to leverage this large and growing source of traffic to their websites. Furthermore, as this growth continues, social media, among other things, has increased the influence of individuals on the web. By following other users on Twitter or participating in social networks, users may influence one another when making decisions on content consumption.

There is therefore a need in the art for approaches for ranking content using real-time information. For example, these content management systems do not have a third party source of information that is unbiased and feeding in the latest trends and topics being discussed on the real-time web by users with similar interests and matching them to the publishers distribution content.

Accordingly, it is desirable to provide methods, systems, and media that overcome these and other deficiencies of the prior art.

SUMMARY OF THE INVENTION

Mechanisms for ranking content using real-time data are provided.

Generally speaking, these mechanisms collect real-time data from multiple sources and rank content based on the real-time data. More particularly, these mechanisms rank and/or re-sort digital content before it is presented to a user by taking into account real-time data (e.g., real-time online trends, real-time influence data, a user's short and long term interests and past behaviors, etc.).

These mechanisms, such as methods, systems, and media, can be used in a variety of applications. For example, digital publishers and advertisers working through their content management systems are constantly searching for approaches to place the right content in front of the right user at the right time in order to increase traffic to their websites. Content of a publisher is ranked before presenting it to a browser user while taking into account online trends, content popularity, user interests, etc. For example, content can be ranked at every instance prior to presenting it to a browser such that the order of ranked content changes at predefined intervals (e.g., every thirty seconds, every minute, every ten seconds between the hours of 9 AM and 9 PM and every minute in all other scenarios, etc.). These mechanisms can be used for content optimization, where a particular publisher's content can be matched with real-time trend information. In a more particular example, these mechanisms can be used to optimize and/or promote particular content to a position of discovery. This content discovery approach can help publishers and/or advertisers place their content in front of the user resulting in higher click through rates on their web pages, which translates to a substantial increase in subscriptions and/or advertising revenue. In addition, this can also lower bounce rates on these pages and provide better search engine optimizations (SEOs) as substantially more relevant content based on real-time information are promoted on their pages and spread through the network (sometimes referred to as high velocity stories or high velocity content).

Accordingly, these mechanisms can lead to more clicks, which leads to more page views, thereby allowing entities, such as content providers and publishers, to significantly grow their user base, increase actions on their websites, and/or increase advertising revenue.

It should be noted that the nature of the explosive growth in usage and participation has created an active stream of unstructured data that can be leveraged for creating rich actionable insights to core solutions, such as content optimization, automated publishing, and intelligent participation in the real-time web.

Methods, systems, and media for content ranking using real-time data are provided. In accordance with some embodiments of the present invention, a method, implemented on a processor, for ranking content is provided. The method can include: receiving real-time information from a plurality of sources; supplementing the received real-time information with historical information and user influence information; analyzing the supplemented real-time information from the plurality of sources to determine real-time trend information; receiving a plurality of content snippets from a content provider; detecting similarities between each of the plurality of content snippets and the determined real-time trend information; ranking the plurality of content snippets based on the detected similarities; and displaying the ranked plurality of content snippets.

In some embodiments, the received real-time information includes at least one of structured real-time information and unstructured real-time information.

In some embodiments, the plurality of content snippets from a content provider comprises receiving the plurality of content snippets from a data feed. However, it should be noted that content or content packets from one or more content providers can be received in any suitable data format. For example, in some embodiments, the data feed is one of: a Really Simple Syndication (RSS) feed, an Atom feed, an Extensible Markup Language (XML) feed, and data provided in JavaScript Object Notation (JSON) format.

In some embodiments, the plurality of sources providing real-time information comprise one or more of: a social media network, a social messaging service, a social content sharing service, an e-mail message, an instant message, a short message service (SMS) message, a web service, a weblog, and a search engine.

In some embodiments, the user influence information includes personally related information received or derived from a user. In some embodiments, the method further comprises ranking the plurality of content snippets based on the detected similarities with the determined real-time trend information and based on the historical and personally related information received or derived from the user.

In some embodiments, the method further comprises generating an index of the determined real-time trend information, where a plurality of keywords are extracted from the supplemented real-time information and an association between the plurality of keywords is created to generate the index.

In some embodiments, the method further comprises detecting similarities between each of the plurality of content snippets and the determined real-time trend information by extracting at least one keyword from each of the plurality of content snippets, calculating a similarity score based on a comparison of the extract keyword with each trend in the generated index, and aggregating the similarity score for each trend to generate an aggregated similarity score, where the plurality of content snippets are ranked based at least in part on the aggregated similarity score.

In some embodiments, the method further comprises: receiving a plurality of data feeds from a plurality of web sources; retrieving content snippets from each of the plurality of data feeds; ranking the retrieved content snippets, wherein the ranking comprises: detecting similarities between each of the plurality of content snippets and real-time trend information from a trend index; generating a personal relevance score for each content snippet; and sorting each of the plurality of content snippets into a content listing based on the personal relevance score; and displaying the ranked content snippets.

In some embodiments, the method further comprises a feedback mechanism that displays a list containing unranked content snippets, where the content snippets are the content snippets in the ranked content snippets; receiving feedback from a plurality of users with respect to the list containing the unranked content snippets; and using the received feedback to determine performance of one or more models used to rank the content snippets.

In some embodiments, a system for ranking content is provided, the system comprising a processor that: receives real-time information from a plurality of sources; supplements the received real-time information with historical information and user influence information; analyzes the supplemented real-time information from the plurality of sources to determine real-time trend information; receives a plurality of content snippets from a content provider; detects similarities between each of the plurality of content snippets and the determined real-time trend information; ranks the plurality of content snippets based on the detected similarities; and displays the ranked plurality of content snippets.

In some embodiments, a non-transitory computer-readable medium containing computer-executable instructions that, when executed by a processor, cause the processor to perform a method for ranking content is provided, the method comprising: receiving real-time information from a plurality of sources; supplementing the received real-time information with historical information and user influence information; analyzing the supplemented real-time information from the plurality of sources to determine real-time trend information; receiving a plurality of content snippets from a content provider; detecting similarities between each of the plurality of content snippets and the determined real-time trend information; ranking the plurality of content snippets based on the detected similarities; and displaying the ranked plurality of content snippets.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

FIGS. 5 and 6 are diagrams of illustrative ranked content screens displayed by the content ranking application in accordance with some embodiments of the disclosed subject matter.

FIG. 10 is a diagram of an illustrative widget creation screen displayed by the content ranking application in accordance with some embodiments of the disclosed subject matter.

DETAILED DESCRIPTION OF THE INVENTION

Methods, systems, and media for ranking content using real-time data are provided.

Generally speaking, these mechanisms provide a content ranking application (sometimes referred to herein as "the application"). More particularly, the application can use collected real-time data from multiple sources to rank (or re-rank) content based on the real-time data. The application can rank, re-rank, and/or re-sort digital content before it is presented to a browser user by taking into account real-time data (e.g., real-time online trends, real-time influence data, a user's short and long term interests and past behaviors, etc.) from one or more sources. For example, content can be ranked at every instance prior to presenting it to a browser such that the order of ranked content can change at predefined intervals (e.g., every thirty seconds, every minute, every ten seconds between the hours of 9 AM and 9 PM and every minute in other scenarios, etc.).

Figure 1:
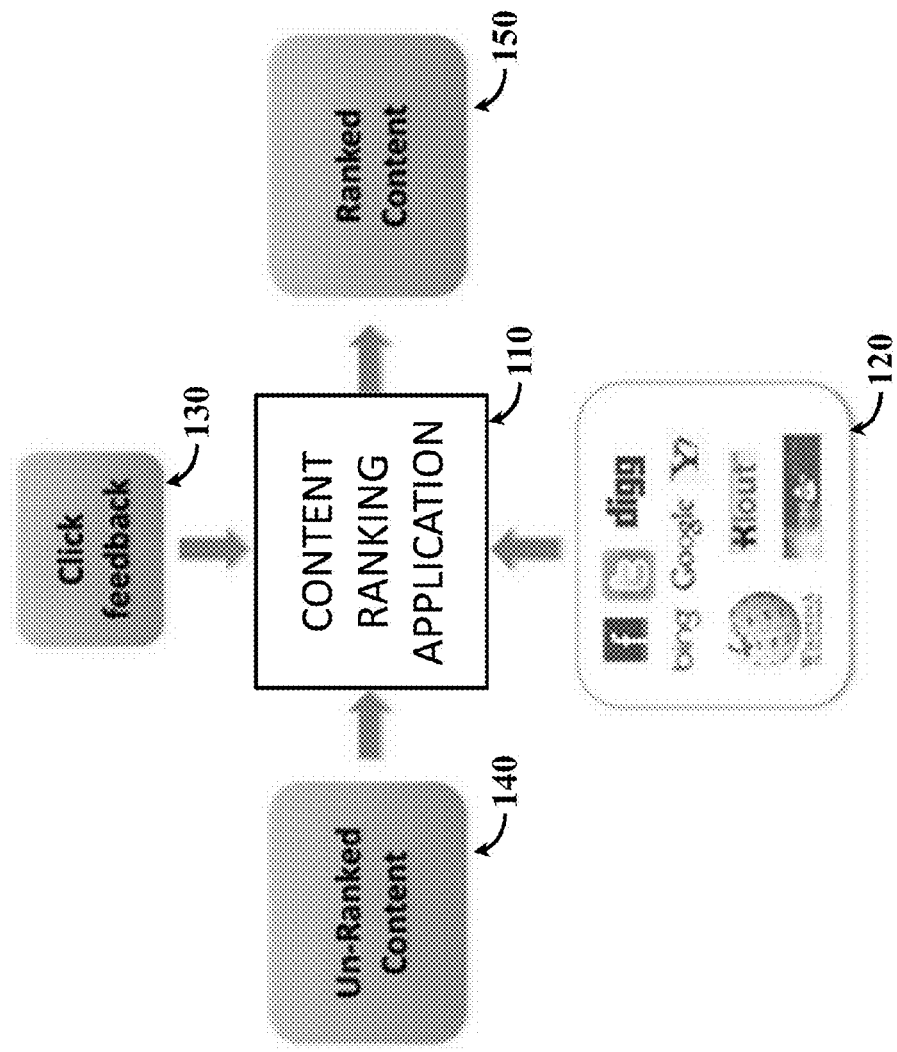
FIG. 1 is a diagram of an illustrative content ranking application in accordance with some embodiments of the disclosed subject matter.

For example, as shown in FIG. 1, content ranking application 110 can receive structured and/or unstructured real-time data from one or more sources 120. These sources 120 can include, for example, social media networks (e.g., Facebook, LinkedIn, MySpace etc.), social networking services (e.g., Twitter), social content sharing services (e.g., Digg), e-mail, instant messaging, short message service (SMS) messaging, various web services (e.g., ShareThis, AddThis, and bit.ly), weblogs, search engines (e.g., Google, Bing, Yahoo, etc.), and/or any other suitable source of real-time data.

As also shown in FIG. 1, in some embodiments, content ranking application 110 can receive click feedback from one or more sources. For example, content ranking application 110 can receive a stream of click data based on user feedback or a click log. In another example, content ranking application 110 can receive a stream of click data relating to a particular user that is viewing a particular web page such that the content ranking application 110 can rank and/or present content on the webpage to that particular user. In yet another example, content ranking application 110 can aggregate or collect click feedback 130 for analysis. Alternatively, as described herein, content ranking application 110 can create a feedback loop by monitoring and/or capturing click data from one or more users on, for example, a ranked list of content snippets. More particularly, the feedback loop can be used by the content ranking application 110 to compare the engagement with a ranked list of content snippets and the engagement with an unranked list of content snippets. Click feedback and click redirection can be used to train, update, and/or optimize the models for matching content to determined trend data, the models for ranking content, the models for indexing real-time trend information, etc.

Using real-time data from one or more sources 120 (e.g., real-time online trends, real-time influence data, a user's short and long term interests and past behaviors, etc.) and/or click feedback 130, the content ranking application 110 can obtain unranked content 140 (e.g., content snippets from a particular web site) and rank the content to provide ranked content 150.

These mechanisms, such as methods, systems, and media, can be used in a variety of applications. For example, digital publishers and advertisers working through their content management systems are constantly searching for approaches to place the right content in front of the right user at the right time in order to increase traffic to their websites. Content of a publisher is ranked before presenting it to a browser user while taking into account online trends, content popularity, user interests, etc. For example, content can be ranked at every instance prior to presenting it to a browser such that the order of ranked content changes at predefined intervals (e.g., every thirty seconds, every minute, every ten seconds between the hours of 9 AM and 9 PM and every minute in all other scenarios, etc.). These mechanisms can be used for content optimization, where a particular publisher's content can be matched with real-time trend information. In a more particular example, these mechanisms can be used to optimize and/or promote particular content to a position of discovery. This content discovery approach can help publishers and/or advertisers place their content in front of the user resulting in higher click through rates on their web pages, which translates to a substantial increase in subscriptions and/or advertising revenue. In addition, this can also lower bounce rates on these pages and provide better search engine optimizations (SEOs) as substantially more relevant content based on real-time information are promoted on their pages and spread through the network (sometimes referred to as high velocity stories or high velocity content).

Accordingly, these mechanisms can lead to more clicks, which leads to more page views, thereby allowing entities, such as content providers and publishers, to significantly grow their user base, increase actions on their websites, and/or increase advertising revenue.

The nature of the explosive growth in usage and participation has created an active stream of unstructured data that can be leveraged for creating rich actionable insights to core solutions, such as content optimization, automated publishing, and intelligent participation in the real-time web.

Figure 2:
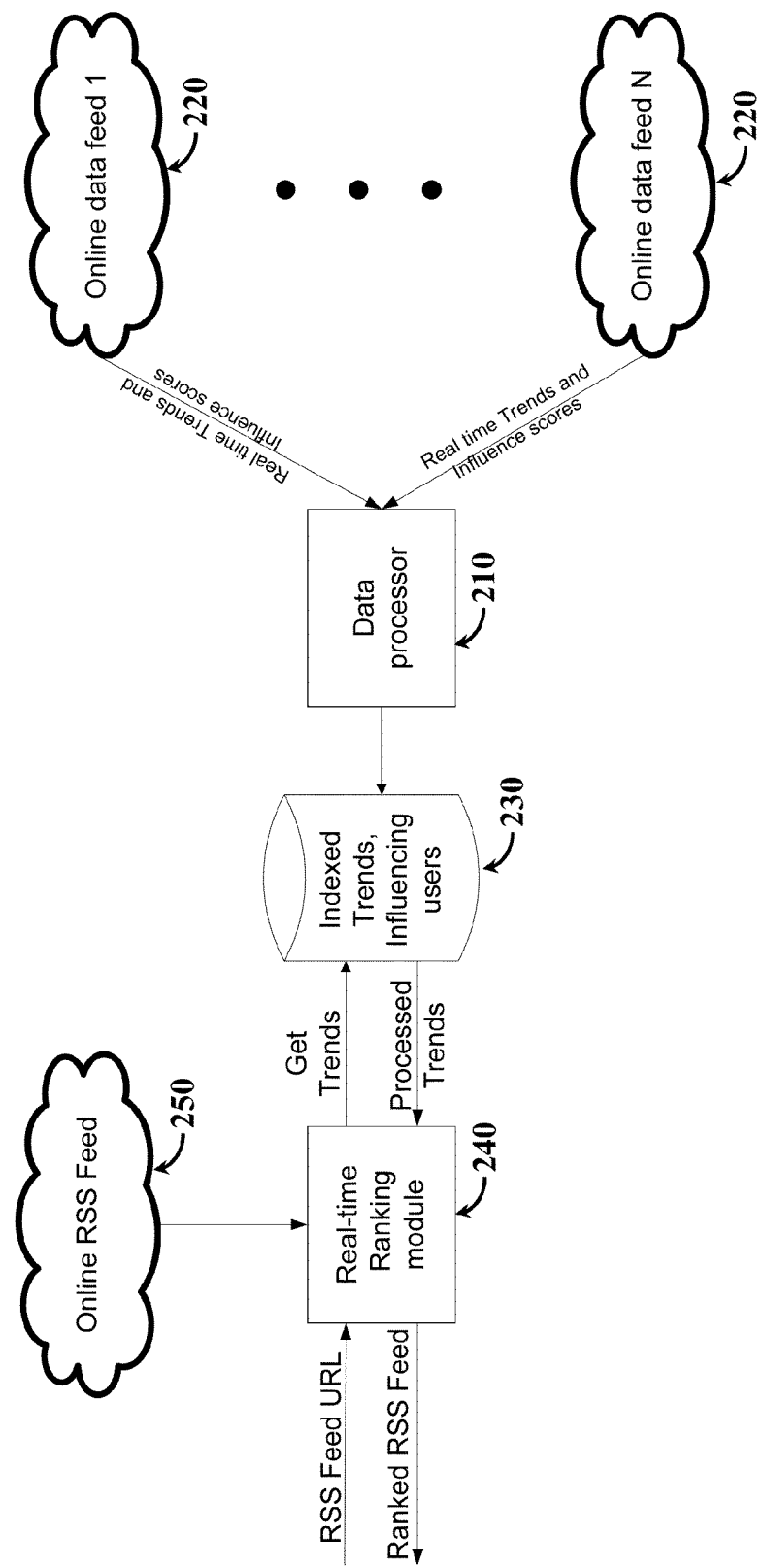
FIG. 2 is a diagram of an illustrative content ranking application used with RSS feeds or other suitable content representations in accordance with some embodiments of the disclosed subject matter.

A more particular example or implementation is shown in FIG. 2. As shown, the application can include a data processing module 210 that collects structured and/or unstructured real-time data from multiple sources 220 (e.g., online data feed 1 through online data feed N). As described above, these sources can include, for example, social media networks (e.g., Facebook, LinkedIn, MySpace etc.), social networking services (e.g., Twitter), social content sharing services (e.g., Digg), e-mail, instant messaging, short message service (SMS) messaging, various web services (e.g., ShareThis, AddThis, and bit.ly), weblogs, search engines (e.g., Google, Bing, Yahoo, etc.), etc. Each of these sources can provide real-time data, which can include, for example, real-time data queries, structured trend queries, influence data queries, sentiment queries, and/or any other suitable information. In addition, an association between data sources can be created through users, date time stamp, trends, and other suitable characteristics.

It should be noted that, although generally described in some of the embodiments herein that the application is receiving content snippets from a RSS feed or an Atom feed, any suitable content or data packets from a content provider can be received. For example, a data feed in JavaScript Object Notation (JSON) format can be received by the application. Moreover, multiple sources can provide content to the application for analysis and/or ranking. For example, the application can receive multiple streams of data from multiple sources, where the application compares the content from each of the multiple sources to real-time data and ranks the content into a single list.

In some embodiments, data processor 210 or any other suitable module of the application can cleanse the collected real-time data. For example, data processor 210 can analyze the real-time data for new entities, keywords, or elements to be indexed. In another example, data processor 210 can clean the real-time data to remove extraneous data. In a more particular example, data processor 210 can be instructed to remove collected data that can identify the browser user (e.g., social security numbers, tax identification information, address information, credit card numbers, maiden names, etc.), thereby ensuring that indexed trends or other real-time information does not accidentally publish such data or that such data does not become part of an index or taxonomy.

In some embodiments, data processor 210 or any other suitable module of the application can also supplement real-time data with additional information. For example, data processor 210 can supplement real-time data with historical data and user influence data or scores.

Users in the real-time web determine what is popular through their participation and/or engagement, where more users discussing a content snippet and/or a topic increases its popularity and relevance in the stream. User influence data can be used to provide an indication that allows real-time content to be differentiated based on the influence score of the user. That is, data processor 210 or any other suitable module of the application can determine that there are one or more influencing users based on the unstructured real-time data from multiple sources. In such an example, each user can be assigned an influence score, where trend data, historical data, and other data relating to a user with a higher influence score can influence, among other things, approaches for ranking content. In addition, content snippets that include the influencing user can be differentiated from other content snippets, where the influence score can be encoded or accounted for within a trend score.

Historical data can also be used to differentiate content—e.g., content that has high engagement or click rates can be differentiated from content with low engagement or click rates. In a more particular example, the historical response to data of the same category can be used as a real-time trend. That is, historical data can supplement trend data to differentiate which trends or types of trends (e.g., names vs. products and activities) are more effective and/or the particular demographic properties (e.g., time of the day, day of the week, geographic location, etc.) where each trend may be more effective. For example, the information that a user that frequents a particular geographic location based on positioning information from a mobile device can be used to supplement real-time information when providing ranked content to that user.

Any suitable piece of data can supplement real-time trend data and assist data processor 210 or any other suitable module of the application determine how to rank the content.

It should be noted that, in some embodiments, the process of collecting real-time data and cleansing, refining, supplementing, and/or expanding it, can be performed at predetermined times (e.g., every 30 seconds, every few minutes, etc.) to keep up with a constantly changing real-time distributed environment.

Referring back to FIG. 2, in response to collecting the real-time data and cleansing, refining, supplementing, and/or expanding it, trend data and/or user influence data can be indexed into trend index 230. For example, a real-time ranking module 240 of the application can determine real-time online trends (e.g., the latest trends and topics) based on the unstructured real-time data from multiple sources. In a more particular example, the real-time ranking module 240 or any other component of the application can collect unstructured real-time data from multiple sources, create an association between the real-time data from the multiple sources through users, timestamps, trends, and/or any other suitable characteristics, cleanse the real-time data by analyzing the data for new entities, keywords, or other elements to be indexed and removing extraneous data (e.g., personal user data), supplement the real-time data with user influence data and/or historical data, and create the index.

It should be noted that the index can be modified, updated, refined, and/or expanded at any suitable time (e.g., every minute). For example, in response to continuously receiving real-time data and content snippets, the application can continue to determine new entities, trends, keywords, and/or other elements for indexing. The index can continue to grow and increase strength as additional information is processed and additional trends are determined. In another example, using historical information, the index can have the ability to track seasonal or repeat events and account for this when ranking content.

Upon receiving processed trends and supplemental data from index 230 or analyzing real-time data to determine real-time trends, real-time ranking module 240 can receive data packets from one or more content providers. For example, one or more really simple syndication (RSS) feeds 250 from a particular publisher can be provided. It should be noted that, although FIG. 2 shows that real-time ranking module 240 receives an online RSS feed 250, any suitable structured representation of information can be provided. For example, a feed in Atom Syndication Format or some other type of weblog feed can be used to provide information regarding updates to a particular weblog, where the information also includes timestamps, author information, profile information, etc. In another example, a publisher can provide the content ranking application with access to the publisher's content for analysis. Alternatively, a combination of RSS feeds, Atom feeds, and data in JSON format can be provided. Again, any suitable content of any suitable type can be ranked using real-time trends, supplemental data, and associated information.

More particularly, real-time ranking module 240 can receive a set of content snippets for ranking. For example, real-time ranking module 240 can receive a set of content snippets from a RSS feed (e.g., from a particular publisher, from a particular content provider, from a particular e-commerce website owner, from a weblog author, etc.). In a more particular example, the RSS feed can include content and information associated with that content (e.g., author, title, date, etc.) and, using processed trends from index 230 or any other suitable real-time data, real-time ranking module 240 can rank the content snippets from the RSS feed.

Similar to the data process 210 described above, the real-time ranking module 240 can cleanse the received set of content snippets. For example, real-time ranking module 240 can analyze the received set of content snippets in the RSS feed for entities, keywords, and/or any other suitable information. Real-time ranking module 240 or any other component of the application can extract entities, keywords, and/or other elements from the received set of content snippets for comparison with entities, keywords, and/or other elements in the trend index. In another example, real-time ranking module 240 can cleanse the received set of content snippets by removing extraneous data.

In some embodiments, real-time ranking module 240 detects similarities between each of the content snippets and the indexed trend data and user influence data (in index 230). For example, real-time ranking module 240 can match trend data and user influence data to information obtained from the content snippets and generate a score for each of the snippets. It should be noted that, in some embodiments, real-time ranking module 240 runs one or more filters against the outputted scores to reduce false positives and true negatives in the scoring.

Based on the determined similarities, a similarity score can be generated for each of the content snippets and real-time ranking module 240 can aggregate the similarity scores from matching trends. Then, based at least in part on the similarity scores, real-time ranking module 240 can sort the content snippets in a particular order (e.g., descending order). An example of the aggregate similarity score is shown, for example, in FIGS. 5 and 8.

In some embodiments, an application program interface (API) for real-time ranking module 240 is provided. The application program interface can allow the ranked or sorted content snippets to be published (e.g., using a RSS feed). An example of displays illustrating the ranking process and the published ranking of content snippets are shown in FIGS. 3-12.

Figure 3:
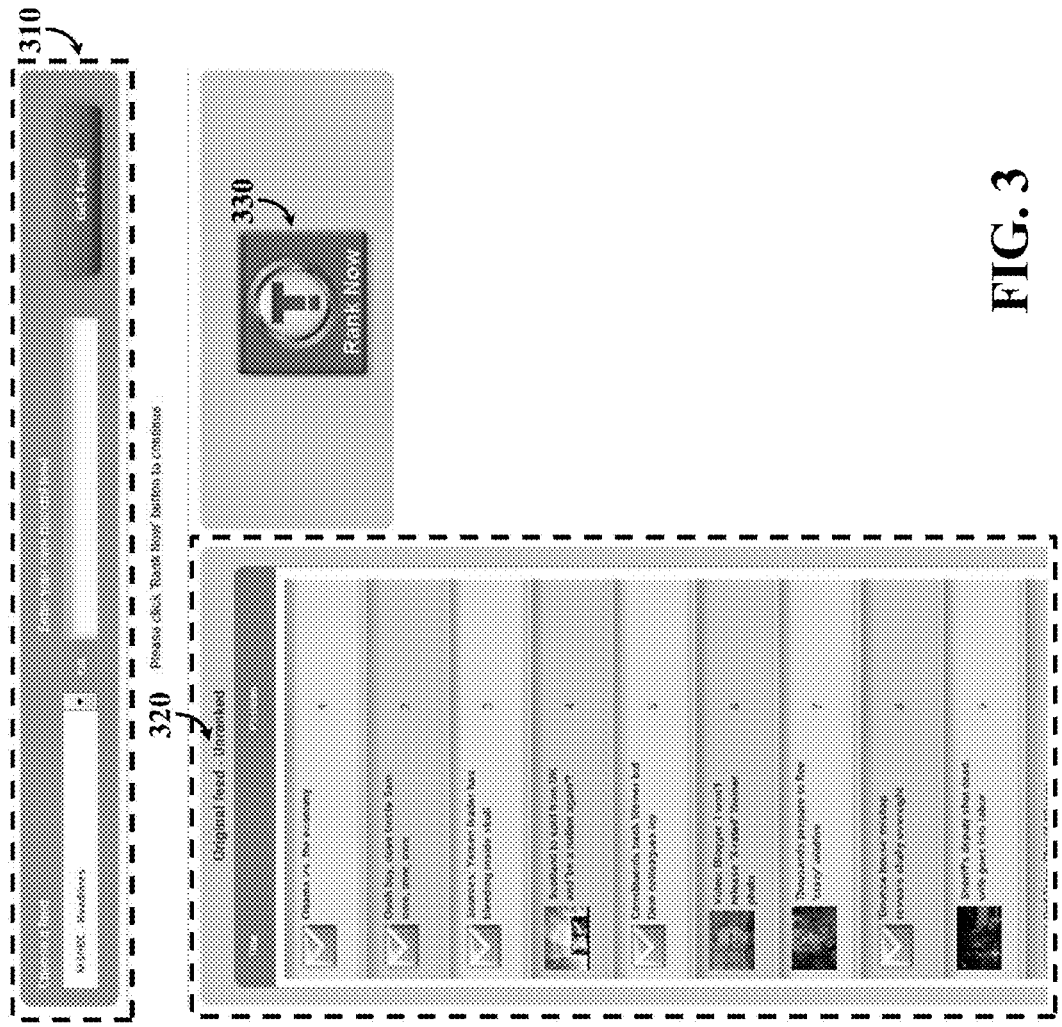
FIG. 3 is a diagram of an illustrative content selection screen displayed by the content ranking application in accordance with some embodiments of the disclosed subject matter.

Turning to FIG. 3, the content ranking application can begin by providing a user (e.g., a publisher, a content provider, a blogger, etc.) with a display for selecting an RSS feed or any other suitable content feed for ranking using window 310. As noted above, the content ranking application can provide the user with a display for selecting any suitable representation of content and the content ranking application can provide the user with an opportunity to select from multiple sources of content. In response to selecting the RSS feed, the content ranking application provides the user with a snapshot 320 of the content provided by the RSS feed and its associated position. For example, if the user accessed or visited the website corresponding to the RSS feed, the content of that website would be provided to the user in a particular order (e.g., organized by time, organized into categories, etc.). As shown in FIG. 3, in response to the user selecting the RSS feed entitled "MSNBC—Headlines," the content ranking application provides the user with a preview of the unranked content and its position. The article entitled "Obama vs. the economy" is provided in the first position.

Figure 4:
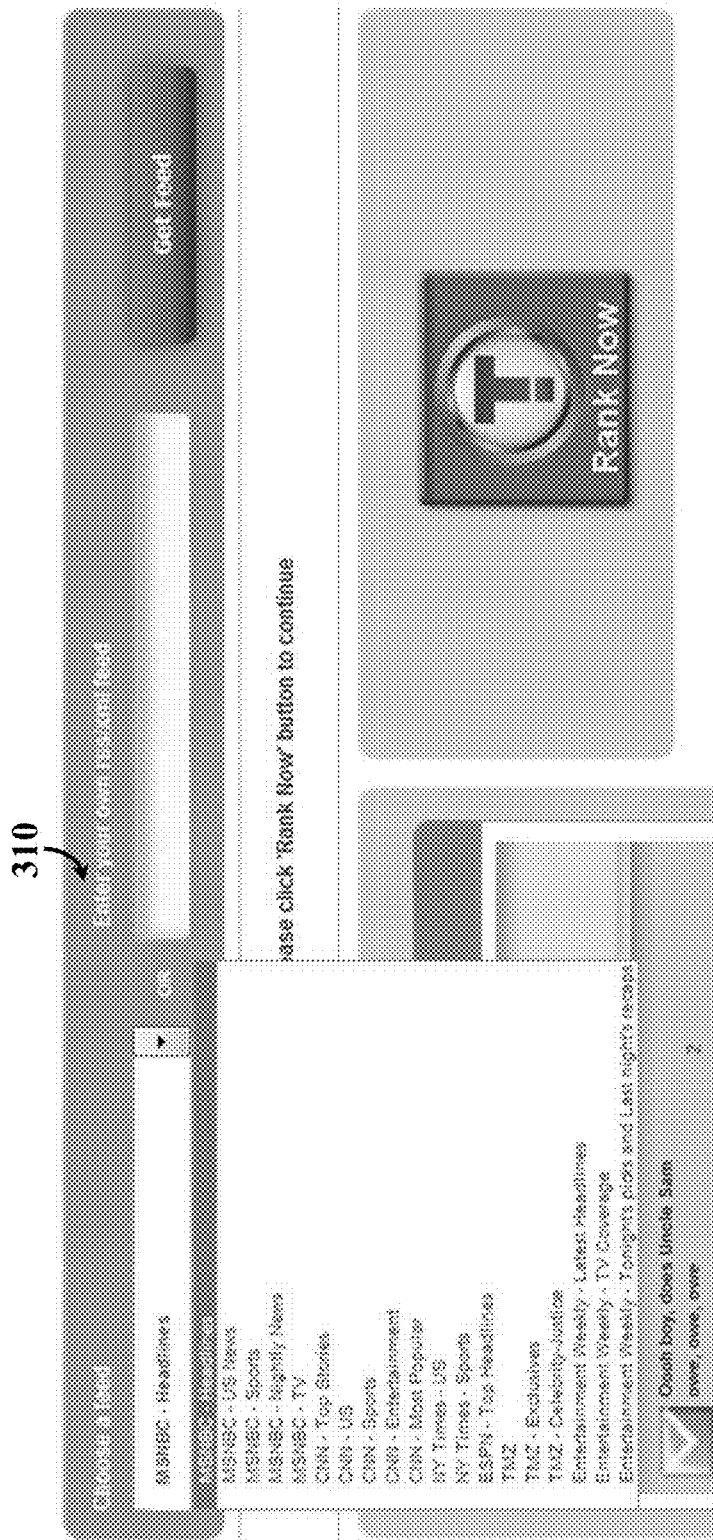
FIG. 4 is a diagram of an illustrative content selection screen displayed by the content ranking application in accordance with some embodiments of the disclosed subject matter.

It should be noted that multiple feeds can be provided to the user for selection. For example, a more detailed view of window 310 is shown in FIG. 4. As shown, the application provides the user with multiple feeds for selection—e.g., various MSNBC feeds, various CNN feeds, various NY Times feeds, etc.

Figure 5:
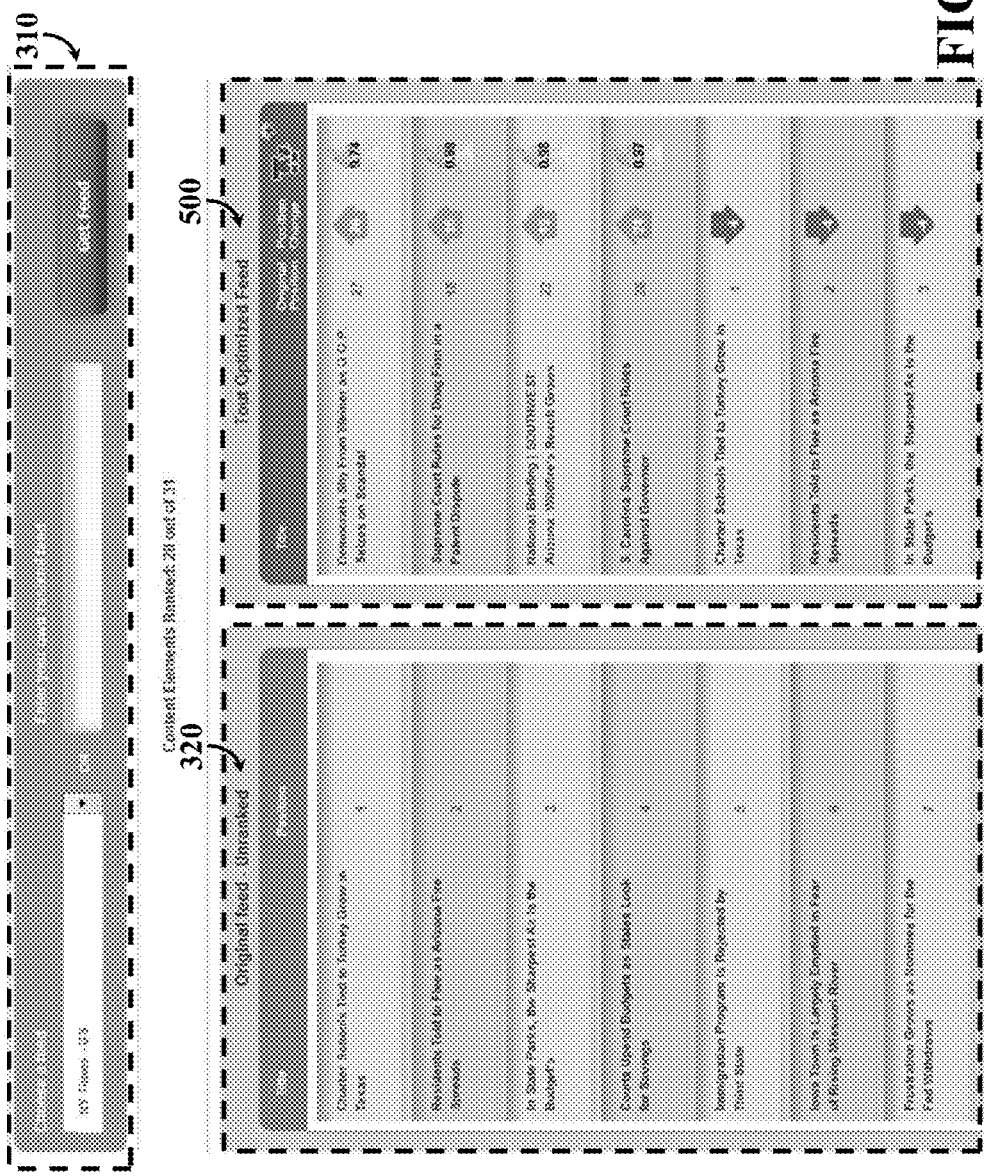

In response to the user providing an indication to rank the selected content (e.g., using "Rank Now" button 330), the content ranking application can retrieve, analyze, and/or apply real-time data and, in particular trend information derived from the real-time data and/or supplemental data, to generate the ranked listing 500 as shown in FIG. 5.

As shown, in response to the user requesting to rank the "NY Times—US" feed, the content ranking application provides a ranked listing 500, where four articles have changed position from original unranked listing 320. For example, the article entitled "Democrats Shy From Weiner as G.O.P. Seizes on Scandal," based on real-time trend information and user influence scores, have been ranked as the top article. As noted, this is a position change of 26 places—i.e., from the $27^{th}$ positioned article to the $1^{st}$ article. It should also be noted that the user influence score for Representative Weiner may have been increased for a given time based on real-time data (for example, during the collection of real-time data and creation of the index, the application may have determined that content including Representative Weiner was trending).

In addition, as also shown in FIG. 5, the content ranking application can determine or calculate an aggregated trend similarity score that encodes or takes into account the influence of the trends. For example, the aggregated trend similarity score can be calculated based at least in part on the information relating to the trend, the content snippet that is being rank, and the relationship and similarity between the trend information and the content snippet. As shown, the top-most article received an aggregated trend similarity score of 9.74.

In some embodiments, the content ranking application can calculate any suitable score for the content snippet. For example, the content ranking application can calculate an influence score for each content snippet. It should be noted that the content ranking application can determine the influence score in response to detecting similarities between each of the content snippets and the indexed trend data and user influence data.

Another example of a ranked listing is shown in FIG. 6. Similar to the listing shown in FIG. 5, each content snippet is identified by a title and its original position on the website. In FIG. 6, the content ranking application provides a description or a portion of the content in the listing. Upon requesting to rank the received content snippets, the content ranking application provides the user with the ranked list shown in FIG. 6 that also includes, for each content snippet, an influence score and an indication of the matching trends (e.g., super bowl york jersey).

It should be noted that, in response to selecting one of the content snippets from any of FIG. 5 or 6, the content ranking application directs the user to the content on the website associated with that content snippet. For example, as shown in FIG. 5, in response to selecting the content snippet entitled "S. Carolina Supreme Court Rules Against Governor," the content ranking application links the user to the article published on the New York Times website. Alternatively, in response to selecting a content snippet, the content ranking application can provide the user with an explanation for the influence score and the real-time data that caused the change in position. For example, the content ranking application can provide the user with the trends in the content relating to the content snippet that matched trend information from collected real-time data. In another example, the content ranking application can provide the user with options to exclude particular real-time data (e.g., remove a particular piece of real-time data that is skewing the results).

In some embodiments, the content ranking application includes a performance feedback loop that provides user determined relevance feedback from clicks. The feedback loop can contain a sample of unranked content for publication to users so the engagement can be compared in relation to the ranked content. For example, the application can, at a predetermined time, present a listing of unranked content to users and monitor the engagement (e.g., clicks, selections, etc.). At other times, the application can provide the same users or another sample of users with a listing of ranked content, where the content is the same as that included in the listing of unranked content. The application can then compare the engagement of the unranked content and the engagement of the ranked content.

It should be noted that the engagement can be captured through a click redirection to each of the links in the ranked or unranked content listing for tracking with a user identifier (userid). The click redirection can be captured along with userid and uniform resource location (URL) for each click event. Such information can be transmitted to real-time ranking module 240 (FIG. 1) to train one or more models in the module. Accordingly, a feedback loop that provides performance data on the real-time ranking module supports training and optimization of the real-time ranking module.

Figure 7:
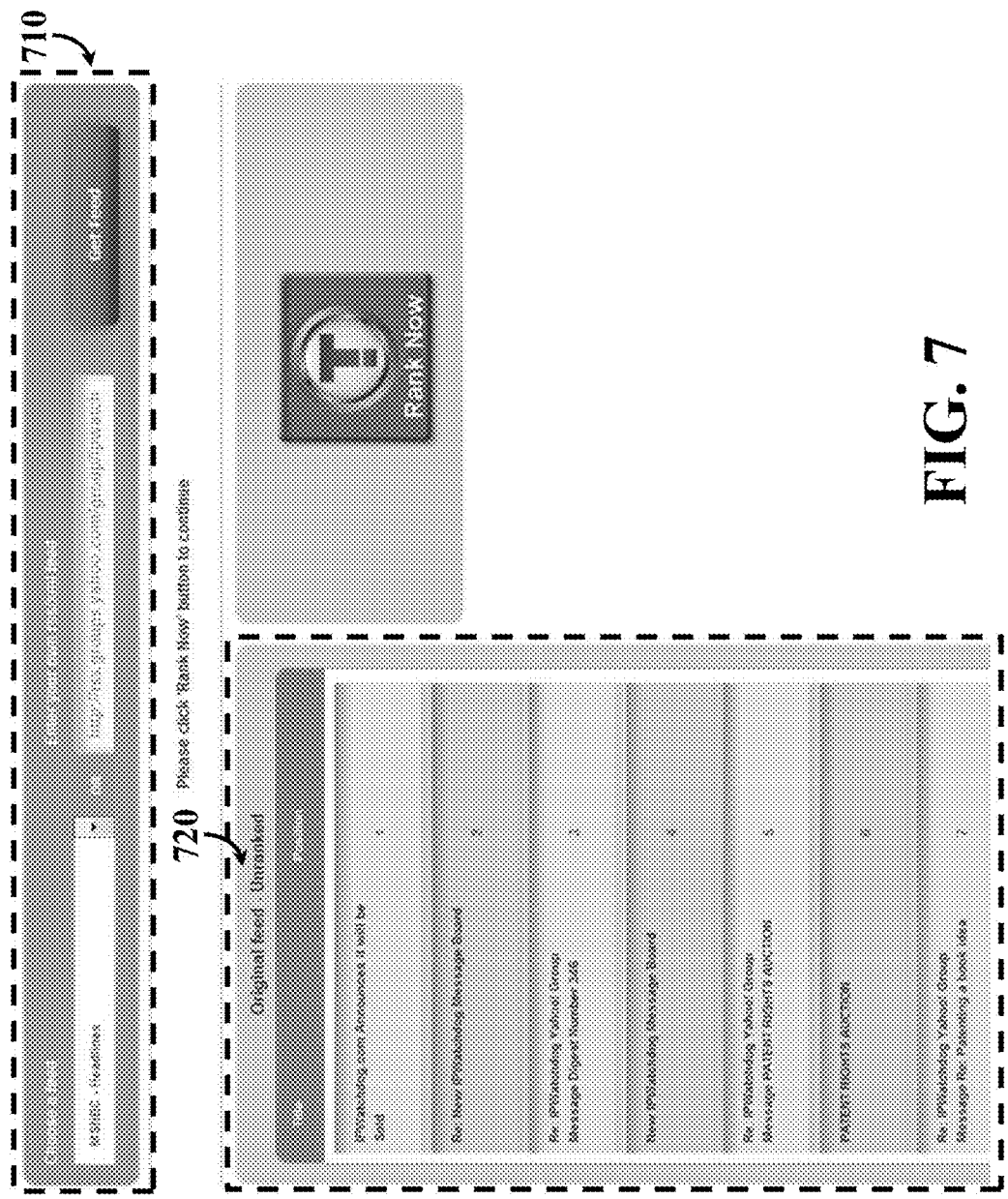
FIG. 7 is a diagram of an illustrative user-inputted content selection screen displayed by the content ranking application in accordance with some embodiments of the disclosed subject matter.

Referring to FIG. 7, instead of selecting a feed from window 410, the content ranking application provides the user with the opportunity to input a user-defined feed. As shown in FIG. 7, the user has inputted an RSS or XML feed relating to the weblog or Internet magazine focusing on patent and innovation news and policy named "IPWatchdog." In response, the content ranking application uses the inputted RSS feed to retrieve unranked content and associated content information. Upon requesting to rank the content from IPWatchdog, the content ranking application retrieves trend information from the trend index and compares the trend information to the unranked content and information associated with the content.

Figure 8:
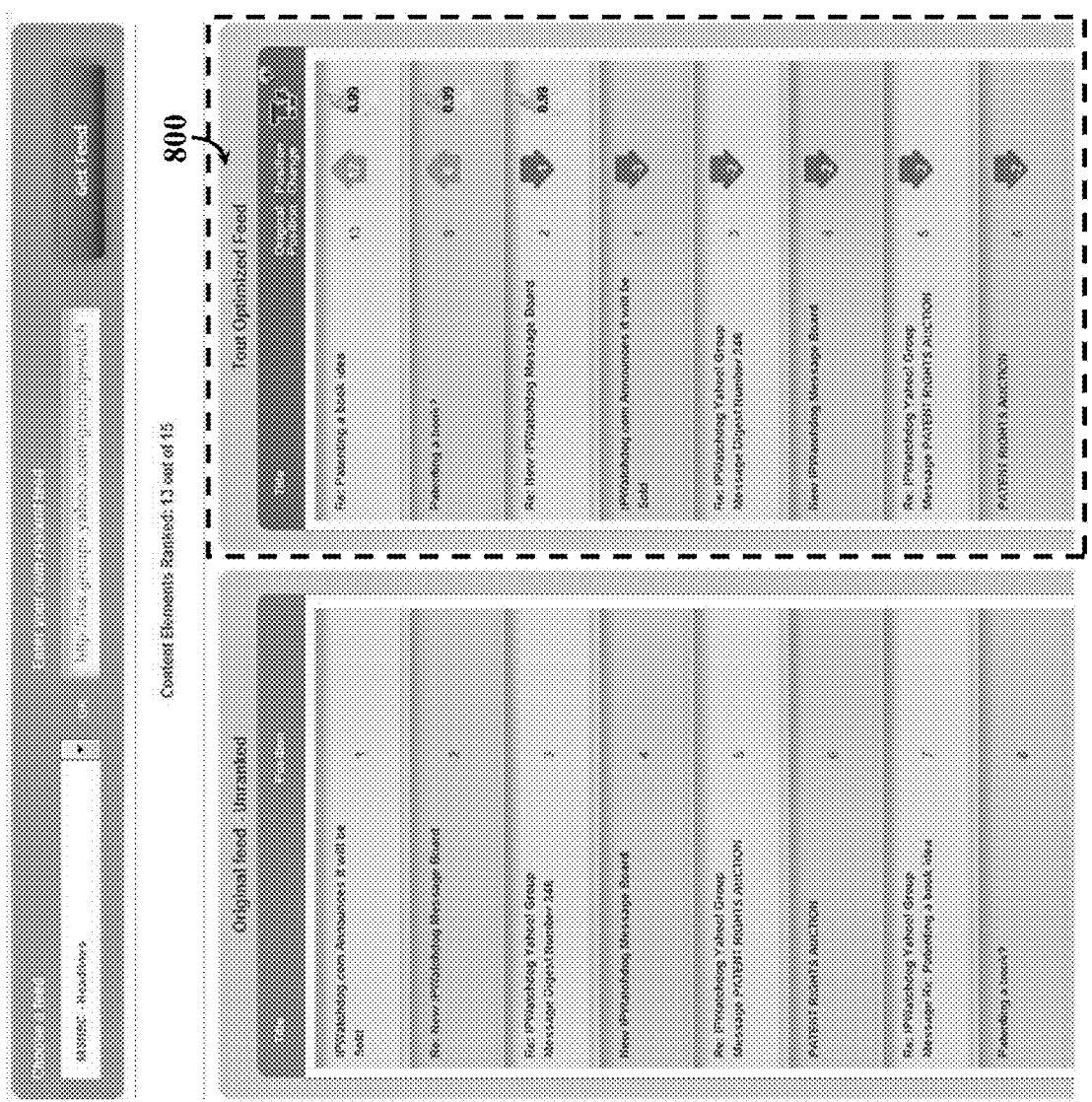
FIG. 8 is a diagram of an illustrative ranked content screen in response to receiving a user-inputted feed that is displayed by the content ranking application in accordance with some embodiments of the disclosed subject matter.

As shown in FIG. 8, the content ranking application has indicated that two articles and their subsequent user comments relating to "patenting a book" should be the highest ranked pieces of content. The user that receives the ranked list can, for example, choose to reorganize the website to correspond to the ranked list. In another example, the user can be provided with the opportunity to request that the content ranking application reorganize the website content accordingly or through an RSS feed.

In some embodiments, the content ranking application that receives an inputted RSS feed or any other suitable form of content packets can customize the presentation of content for a particular browser user. For example, in addition to retrieving trend information from the trend index, the content ranking application can retrieve information about the particular browser user. This information can include, for example, a user profile, previous search history corresponding to the user, past behaviors of the user, a social graph, areas of interest, etc. Upon retrieving this additional information relating to the particular browser user, the content ranking application can be used to create a ranked version of the website tailored to the particular browser user. That is, the content ranking application can receive content snippets of a website and provide a customized version of the website based on real-time data (e.g., real-time online trends, real-time influence data, etc.) and user data (e.g., user's interests, user's past behaviors, etc.).

In a more particular example, the content ranking application can be configured to provide a customized homepage for browser users visiting the user's website. In this embodiment, for browser users that the content ranking application can obtain user information, the content ranking application can generate a customized version of the website based on real-time data and user data, where the customized version appears as a homepage with links to content relevant to the particular user. Alternatively, if user information cannot be obtained for a browser user, that browser user is provided with unranked content or a particular version of the website selected by the user (e.g., a continuously updated listing of content snippets based on real-time influence data).

In another more particular example, the content ranking application can be configured to be a website that ranks third-party content based on real-time relevance information and user information. In this embodiment, a browser user can access the content ranking application and input preferences (e.g., interests, topics, demographic information, pychographic information, etc.). In response, the content ranking application can select one or more feeds and sort the content snippets from those feeds based on real-time data and the inputted preferences.

It should be noted that the content provider, publisher, or any other suitable entity can perform any suitable action in response to receiving the ranked listing of content snippets. For example, the content provider can request that the content ranking application re-rank specific portions of the content provider's website. In another example, a publisher can request that the content ranking application rank one or more websites associated with the publisher.

Accordingly, the content ranking application receives content from a provider in the form of content snippets and, using real-time trend information, ranks the content. This allows the provider or any other suitable entity to discover which content is trending now, promote the appropriate content, and re-rank or redistribute content in a timely fashion. Delivering content when and where it is relevant to the provider's audience can result in, among other things, greater visitation, higher engagement, and/or customer acquisition. Moreover, the content ranking application can achieve this without the need to reformat content or cache results.

Figure 9:
FIG. 9 is a diagram of an illustrative popular content screen that is displayed by the content ranking application in accordance with some embodiments of the disclosed subject matter.

In some embodiments, the content ranking application can provide the user with an indication of the popular articles at a point in time based on determined trend information and data feeds from one or more sources. For example, the content ranking application can provide users with content from various sources organized by topic (e.g., business, technology, etc.) or any other suitable categorization. As shown in FIG. 9, content from multiple sources are organized into various topics and by timestamp (e.g., when the content was posted). It should be noted that content ranking application can update the lists at a predetermined time (e.g., every 10 seconds, every minute, etc.). The content ranking application can then allow the user to rank each of the lists based on real-time trend data and supplemental data.

In some embodiments, the content ranking application can allow the user to create a widget or portion of a website or a network that provided ranked snippets of content from one or more data feeds. In a more particular example, a user is a real estate broker in the New York area and has a professional weblog, page on a social networking website, or a page on the company's website that the user generally uses to post new listings and open house information. The user also reviews recent news and postings on a number of third-party RSS feeds and would like to share them with the readers of the user's weblog.

As shown in FIG. 10, the content ranking application can provide the user with a widget creation screen. In addition to inputting a name for the widget in field 1010 and a title for the widget in field 1020, the content ranking application allows the user to input multiple RSS feeds. In FIG. 10, the user has inputted two RSS feeds associated with real estate websites for the New York Times—Real Estate section and Curbed into field 1030.

In some embodiments, the widget creation screen provides the user with appearance options. For example, the user can configure the created widget to match the appearance settings or layout on the user's website. In another example, the user can configure the created widget to attract attention on the user's website as it contains popular content snippets. As shown, the appearance options can include width, height, background color, font color, font size, number of results, highlighting options, hiding options, etc.

Figure 11:
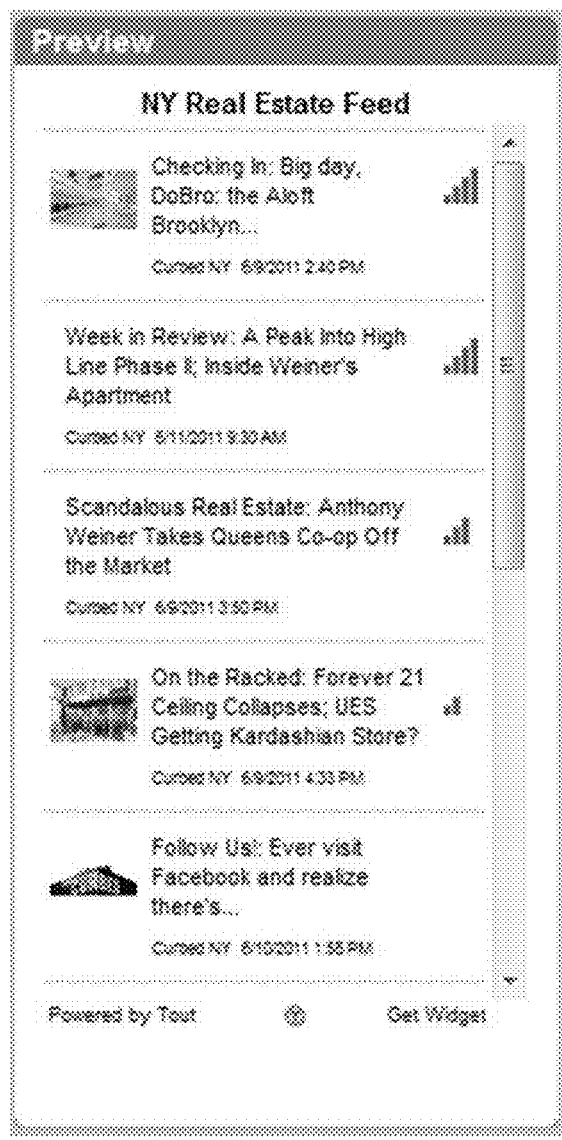
FIG. 11 is a diagram of an illustrative widget preview screen displayed by the content ranking application in accordance with some embodiments of the disclosed subject matter.

In some embodiments, the content ranking application allows the user to preview the created widget prior to placing it on the user's website. For example, as shown in FIG. 11, a preview 1100 of the created widget is generated in response to selecting the preview button 1040 shown in FIG. 10. Preview 1100 provides the user with content snippets from the one or more inputted RSS feeds that have been sorted based on real-time data and the score or popularity indicator used to rank the content snippets. For each content snippet, preview 1100 can also provide the browser user with an image from the content, an indication of the feed source, a timestamp, and a trend indicator. That is, as shown in FIG. 11, preview 1100 or any other suitable display presented by the application can display a trend indicator that informs users how a particular piece of content is trending. This trend indicator (represented as bars in preview 1100) highlights particular pieces of content, thereby distinguishing higher trending pieces of content from other pieces of content.

As described above, preview 1100 can be configured to direct the browser user to the content in response to selecting a particular content snippet.

Referring back to FIG. 10, in response to configuring the widget, the content ranking application allows the user to obtain the code associated with the widget for placement on the user's website.

Figure 12:
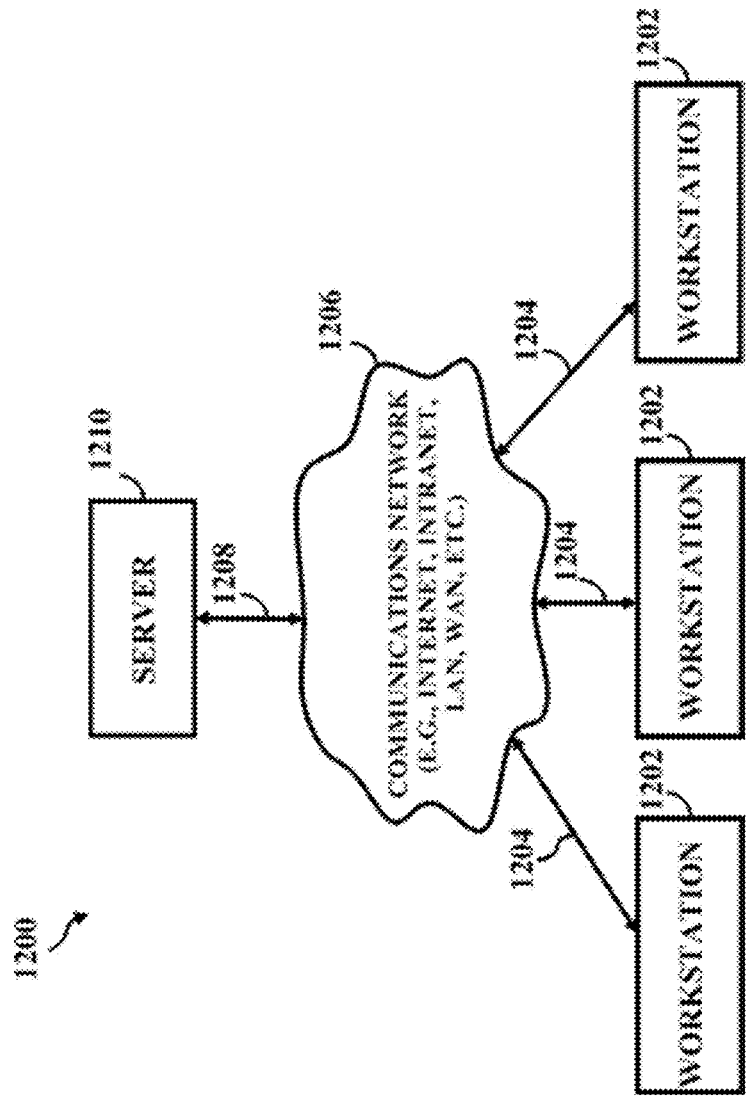
FIG. 12 is a diagram of an illustrative system on which a rating application can be implemented in accordance with some embodiments of the disclosed subject matter.

FIG. 12 is a generalized schematic diagram of a system 1200 on which the interactive inventory management application may be implemented in accordance with some embodiments of the disclosed subject matter. As illustrated, system 1200 may include one or more user computers 1202. User computers 1202 may be local to each other or remote from each other. User computers 1202 are connected by one or more communications links 1204 to a communications network 1206 that is linked via a communications link 1208 to a server 1210.

System 1200 may include one or more servers 1210. Server 1210 may be any suitable server for providing access to the application, such as a processor, a computer, a data processing device, or a combination of such devices. For example, the application can be distributed into multiple backend components and multiple frontend components or interfaces. In a more particular example, backend components, such as data collection and data distribution can be performed on one or more servers 1210. Similarly, the graphical user interfaces displayed by the application, such as a data interface and an advertising network interface, can be distributed by one or more servers 1210 to user computer 1202.

More particularly, for example, each of the client 1202 and server 1210 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 1002 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 12, communications network 1206 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1204 and 1208 may be any communications links suitable for communicating data between user computers 1202 and server 1210, such as network links, dial-up links, wireless links, hard-wired links, any other suitable communications links, or a combination of such links. User computers 1202 enable a user to access features of the application. User computers 1202 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 1202 and server 1210 may be located at any suitable location. In one embodiment, user computers 1202 and server 1210 may be located within an organization. Alternatively, user computers 1202 and server 1210 may be distributed between multiple organizations.

Figure 13:
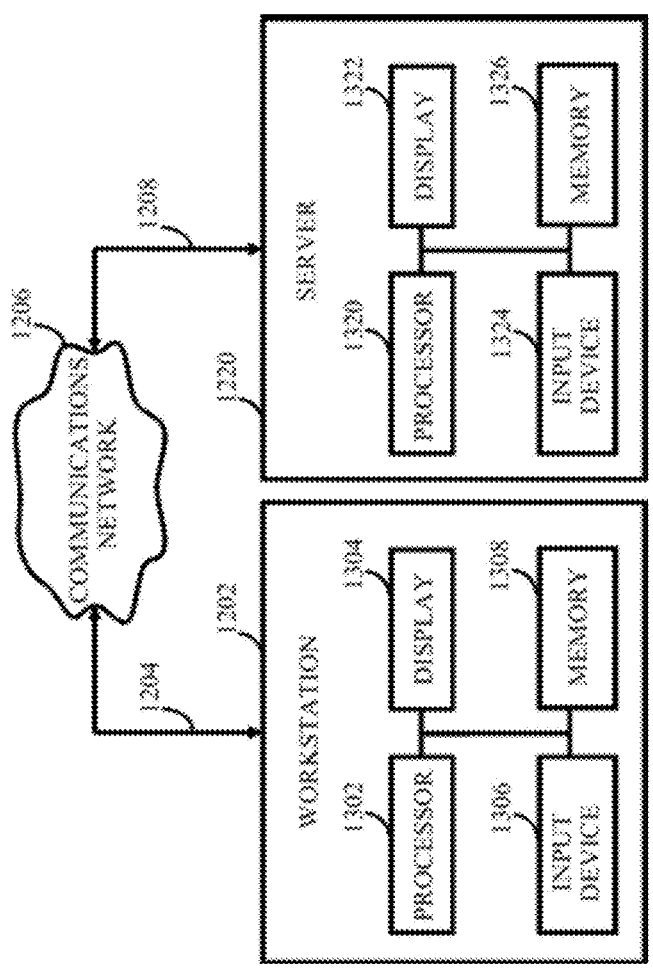
FIG. 13 is a diagram of an illustrative user computer and server as provided, for example, in FIG. 12 in accordance with some embodiments of the disclosed subject matter.

Referring back to FIG. 12, the server and one of the user computers depicted in FIG. 12 are illustrated in more detail in FIG. 13. Referring to FIG. 13, user computer 1202 may include processor 1302, display 1304, input device 1306, and memory 1308, which may be interconnected. In a preferred embodiment, memory 1308 contains a storage device for storing a computer program for controlling processor 1302.

Processor 1302 uses the computer program to present on display 1304 the application and the data received through communications link 1204 and commands and values transmitted by a user of user computer 1202. It should also be noted that data received through communications link 1204 or any other communications links may be received from any suitable source. Input device 1306 may be a computer keyboard, a cursor-controller, dial, switchbank, lever, or any other suitable input device as would be used by a designer of input systems or process control systems.

Server 1210 may include processor 1320, display 1322, input device 1324, and memory 1326, which may be interconnected. In a preferred embodiment, memory 1326 contains a storage device for storing data received through communications link 1208 or through other links, and also receives commands and values transmitted by one or more users. The storage device further contains a server program for controlling processor 1320.

In some embodiments, the application may include an application program interface (not shown), or alternatively, the application may be resident in the memory of user computer 1202 or server 1210. In another suitable embodiment, the only distribution to user computer 1202 may be a graphical user interface ("GUI") which allows a user to interact with the application resident at, for example, server 1210.

In one particular embodiment, the application may include client-side software, hardware, or both. For example, the application may encompass one or more Web-pages or Webpage portions (e.g., via any suitable encoding, such as Hyper- Text Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, methods, systems, and media for content ranking using real-time data are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for ranking content, the method comprising:
   receiving, using a processor, real-time information from a plurality of sources;
   supplementing the received real-time information with historical information and user influence information;
   analyzing the supplemented real-time information from the plurality of sources to determine real-time trend information;
   generating an index of the determined real-time trend information, wherein a plurality of keywords are extracted from the supplemented real-time information and an association between the plurality of keywords is created to generate the index;
   receiving a plurality of content snippets from a content provider;
   detecting similarities between each of the plurality of content snippets and the determined real-time trend information using the generated index;
   calculating an influence score for each of the plurality of content snippets based on the detected similarities with the determined real-time trend information;
   ranking the plurality of content snippets based on the detected similarities with the determined real-time trend information based on the historical information, and based on the influence score; and
   displaying the ranked plurality of content snippets.

2. The method of claim 1, wherein the received real-time information includes at least one of structured real-time information and unstructured real-time information.

3. The method of claim 1, wherein the plurality of content snippets from a content provider comprises receiving the plurality of content snippets from a data feed.

4. The method of claim 3, wherein the data feed is one of: a Really Simple Syndication (RSS) feed, an Atom feed, an Extensible Markup Language (XML) feed, and data provided in JavaScript Object Notation (JSON) format.

5. The method of claim 1, wherein the plurality of sources providing real-time information comprise one or more of: a social media network, a social messaging service, a social content sharing service, an e-mail message, an instant message, a short message service (SMS) message, a web service, a weblog, and a search engine.

6. The method of claim 1, further comprising:
   receiving a plurality of data feeds from a plurality of web sources;
   retrieving content snippets from each of the plurality of data feeds;
   ranking the retrieved content snippets, wherein the ranking comprises:
      detecting similarities between each of the plurality of content snippets and real-time trend information from a trend index;
      generating a personal relevance score for each content snippet; and
      sorting each of the plurality of content snippets into a content listing based on the personal relevance score; and
   displaying the ranked content snippets.

7. A method for ranking content, the method comprising:
receiving, using a processor, real-time information from a plurality of sources;
supplementing the received real-time information with historical information and user influence information;
analyzing the supplemented real-time information from the plurality of sources to determine real-time trend information;
generating an index of the determined real-time trend information, wherein a plurality of keywords are extracted from the supplemented real-time information and an association between the plurality of keywords is created to generate the index;
receiving a plurality of content snippets from a content provider;
detecting similarities between each of the plurality of content snippets and the determined real-time trend information by extracting at least one keyword from each of the plurality of content snippets, calculating a similarity score based on a comparison of the extract keyword with each trend in the generated index, and aggregating the similarity score for each trend to generate an aggregated similarity score, wherein the plurality of content snippets are ranked based at least in part on the aggregated similarity score;
ranking the plurality of content snippets based on the detected similarities; and
displaying the ranked plurality of content snippets.

8. A method for ranking content, the method comprising:
receiving, using a processor, real-time information from a plurality of sources;
supplementing the received real-time information with historical information and user influence information;
analyzing the supplemented real-time information from the plurality of sources to determine real-time trend information;
receiving a plurality of content snippets from a content provider;
detecting similarities between each of the plurality of content snippets and the determined real-time trend information;
ranking the plurality of content snippets based on the detected similarities;
displaying the ranked plurality of content snippets;
displaying a list containing unranked content snippets, wherein the content snippets are the content snippets in the ranked content snippets;
receiving feedback from a plurality of users with respect to the list containing the unranked content snippets; and
using the received feedback to determine performance of one or more models used to rank the content snippets.

9. A system for ranking content, the system comprising:
a processor that:
receives real-time information from a plurality of sources;
supplements the received real-time information with historical information and user influence information;
analyzes the supplemented real-time information from the plurality of sources to determine real-time trend information;
generates an index of the determined real-time trend information, wherein a plurality of keywords are extracted from the supplemented real-time information and an association between the plurality of keywords is created to generate the index;
receives a plurality of content snippets from a content provider;
detects similarities between each of the plurality of content snippets and the determined real-time trend information using the generated index;
calculates an influence score for each of the plurality of content snippets based on the detected similarities with the determined real-time trend information;
ranks the plurality of content snippets based on the detected similarities with the determined real-time trend information based on the historical information, and based on the influence score; and
displays the ranked plurality of content snippets.

10. The system of claim 9, wherein the received real-time information includes at least one of structured real-time information and unstructured real-time information.

11. The system of claim 9, wherein the plurality of content snippets from a content provider comprises receiving the plurality of content snippets from a data feed.

12. The system of claim 11, wherein the data feed is one of: a Really Simple Syndication (RSS) feed, an Atom feed, an Extensible Markup Language (XML) feed, and data provided in JavaScript Object Notation (JSON) format.

13. The system of claim 9, wherein the plurality of sources providing real-time information comprise one or more of: a social media network, a social messaging service, a social content sharing service, an e-mail message, an instant message, a short message service (SMS) message, a web service, a weblog, and a search engine.

14. A system for ranking content, the system comprising:
a processor that:
receives real-time information from a plurality of sources;
supplements the received real-time information with historical information and user influence information;
analyzes the supplemented real-time information from the plurality of sources to determine real-time trend information;
generate an index of the determined real-time trend information, wherein a plurality of keywords are extracted from the supplemented real-time information and an association between the plurality of keywords is created to generate the index;
receives a plurality of content snippets from a content provider;
detects similarities between each of the plurality of content snippets and the determined real-time trend information by extracting at least one keyword from each of the plurality of content snippets, calculating a similarity score based on a comparison of the extract keyword with each trend in the generated index, and aggregating the similarity score for each trend to generate an aggregated similarity score, wherein the plurality of content snippets are ranked based at least in part on the aggregated similarity score;
ranks the plurality of content snippets based on the detected similarities; and
displays the ranked plurality of content snippets.

15. The system of claim 9, wherein the processor is further configured to:
receive a plurality of data feeds from a plurality of web sources;
retrieve content snippets from each of the plurality of data feeds;
rank the retrieved content snippets, wherein the processor is further configured to:
detect similarities between each of the plurality of content snippets and real-time trend information from a trend index;

generate a personal relevance score for each content snippet; and sort each of the plurality of content snippets into a content listing based on the personal relevance score; and display the ranked content snippets.

16. A system for ranking content, the system comprising: a processor that:

receives real-time information from a plurality of sources;

supplements the received real-time information with historical information and user influence information;

analyzes the supplemented real-time information from the plurality of sources to determine real-time trend information;

receives a plurality of content snippets from a content provider;

detects similarities between each of the plurality of content snippets and the determined real-time trend information;

ranks the plurality of content snippets based on the detected similarities;

displays the ranked plurality of content snippets;

display a list containing unranked content snippets, wherein the content snippets are the content snippets in the ranked content snippets;

receive feedback from a plurality of users with respect to the list containing the unranked content snippets; and use the received feedback to determine performance of one or more models used to rank the content snippets.

17. A non-transitory computer-readable medium containing computer-executable instructions that, when executed by a processor, cause the processor to perform a method for ranking content, the method comprising:

receiving real-time information from a plurality of sources;

supplementing the received real-time information with historical information and user influence information;

analyzing the real-time information from the plurality of sources to determine real-time trend information;

generating an index of the determined real-time trend information, wherein a plurality of keywords are extracted from the supplemented real-time information and an association between the plurality of keywords is created to generate the index;

receiving a plurality of content snippets from a content provider;

detecting similarities between each of the plurality of content snippets and the determined real-time trend information using the generated index;

calculating an influence score for each of the plurality of content snippets based on the detected similarities with the determined real-time trend information;

ranking the plurality of content snippets based on the detected similarities, based on the historical information, and based on the influence score; and displaying the ranked plurality of content snippets.

18. A non-transitory computer-readable medium containing computer-executable instructions that, when executed by a processor, cause the processor to perform a method for ranking content, the method comprising:

receiving real-time information from a plurality of sources;

supplementing the received real-time information with historical information and user influence information;

analyzing the supplemented real-time information from the plurality of sources to determine real-time trend information;

generating an index of the determined real-time trend information, wherein a plurality of keywords are extracted from the supplemented real-time information and an association between the plurality of keywords is created to generate the index;

receiving a plurality of content snippets from a content provider;

detecting similarities between each of the plurality of content snippets and the determined real-time trend information by extracting at least one keyword from each of the plurality of content snippets, calculating a similarity score based on a comparison of the extract keyword with each trend in the generated index, and aggregating the similarity score for each trend to generate an aggregated similarity score, wherein the plurality of content snippets are ranked based at least in part on the aggregated similarity score;

ranking the plurality of content snippets based on the detected similarities; and displaying the ranked plurality of content snippets.

19. A non-transitory computer-readable medium containing computer-executable instructions that, when executed by a processor, cause the processor to perform a method for ranking content, the method comprising:

receiving real-time information from a plurality of sources;

supplementing the received real-time information with historical information and user influence information;

analyzing the supplemented real-time information from the plurality of sources to determine real-time trend information;

receiving a plurality of content snippets from a content provider;

detecting similarities between each of the plurality of content snippets and the determined real-time trend information;

ranking the plurality of content snippets based on the detected similarities;

displaying the ranked plurality of content snippets;

displaying a list containing unranked content snippets, wherein the content snippets are the content snippets in the ranked content snippets;

receiving feedback from a plurality of users with respect to the list containing the unranked content snippets; and using the received feedback to determine performance of one or more models used to rank the content snippets.

* * * * *